US005575522A

United States Patent [19]
Robinson

[11] Patent Number: 5,575,522
[45] Date of Patent: Nov. 19, 1996

[54] AUTOMOBILE SUN SHIELD

[76] Inventor: Emmett W. Robinson, 105 Veterans Blvd., Lot 14, Kenner, La. 70062

[21] Appl. No.: 495,824

[22] Filed: Jun. 28, 1995

[51] Int. Cl.⁶ ........................................... B60J 3/02
[52] U.S. Cl. .............................................. 296/97.6
[58] Field of Search .................. 296/97.6, 97.8, 296/97.2

[56]  References Cited

U.S. PATENT DOCUMENTS

| | | | |
|---|---|---|---|
| 3,545,805 | 12/1970 | Wilson | 296/97 |
| 3,858,931 | 1/1975 | Van Sickle | 296/97.6 |
| 3,948,554 | 4/1976 | Barbee | 296/97 C |
| 3,954,297 | 5/1976 | Linke et al. | 296/97 C |
| 4,635,995 | 1/1987 | Mineck | 296/97 G |
| 4,982,992 | 1/1991 | Vu et al. | 296/97.6 |

FOREIGN PATENT DOCUMENTS 2313226  12/1976  France ................................. 296/97.8

Primary Examiner—David M. Mitchell
Assistant Examiner—Kia M. Robinson
Attorney, Agent, or Firm—Joseph N. Breaux

[57]  ABSTRACT

An automobile sun shield including an elongated, substantially rectangularly shaped shield member and first and second clip members secured to the shield member and utilized to secure the sun shield to the existing visor of an automobile. One of the clip members is positioned with respect to a shorter side edge of the shield member at a distance within at least twenty percent of the length of one of the longer side edges. The other clip member is positioned with respect to the same side edge a distance therefrom of between twenty-two and thirty-seven percent of the length of one of the longer side edges.

5 Claims, 2 Drawing Sheets

AUTOMOBILE SUN SHIELD

TECHNICAL FIELD

The present invention relates to sun shielding devices for use in automobiles and more particularly to sun shielding devices for use in automobiles that are attachable to the existing sun visor of the automobile and that provide shielding from sunlight shining into the automobile through the rear portion of the front side windows and/or the rear side windows of the automobile.

BACKGROUND ART

Bright sunlight can diminish the comfort and safety of passengers traveling in an automobile. This is true for both the front seat and rear seat passengers. Although most automobiles include a user positionable visor for the front passengers, very few automobiles include any sun shielding visors for the rear passengers. In addition, the visor for the front seat passengers does not extend rearward a sufficient distance to provide shielding for the front seat passenger from sunlight entering through the rear portion of the front side windows over the passenger's shoulder. In addition, the existing visor of automobile does not provide shading to the front seat passengers from sunlight entering through an open sun roof or T-top. It would be a benefit, therefore, to have a sun shielding device that was attachable to the existing visor of an automobile that provided sun shielding for rear seat passengers, and sun shielding for the front seat passenger from sunlight entering from the rear portion of the front side window over the front seat passenger's shoulder. It would be a further benefit to have a sun shielding device that could be positioned over the head of a front seat passenger to provide shading to the head and shoulder area of the passenger when the sun roof or T-top of the automobile is open. It would also be a benefit if the sun shielding device was easily attached to the automobile and was easily stored out of the way when not needed.

GENERAL SUMMARY DISCUSSION OF INVENTION

It is thus an object of the invention to provide a automobile sun shield that is attachable to the existing sun visor of an automobile.

It is a further object of the invention to provide a sun shielding device that is positionable over the head of a front seat passenger to provide shading to the head and shoulder area of the passenger when the sun roof or T-top of the automobile is open.

It is a still further object of the invention to provide a automobile sun shield that is easily stored out of the way when not in use.

It is a still further object of the invention to provide a automobile sun shield that extends from the existing sun visor to provide shielding from sunlight shining into the automobile through the rear portion of the front side window of the automobile.

Accordingly, an automobile sun shield is provided that includes an elongated, substantially rectangularly shaped shield member and first and second clip members secured to the shield member. The first and second clip members are utilized to secure the sun shield to the existing visor of an automobile. The phrase "substantially rectangularly shaped" as used herein means having two pairs of parallel side edges wherein one pair of side edges is perpendicular to the other pair of side edges. The shield member preferably has a length of between eight and fourteen inches, a width of between three and one-half and six inches, and a thickness of between one-sixteenth and one-fourth of an inch. The four corners of the shield member are arcuately curved to prevent injuries to passengers.

The first and second clip member are secured to one planar side of the shield member. Each clip member includes a planar clip surface having an area of at least two square inches. Each planar clip surface is positioned parallel to the planar side surface and spaced a distance of between one-eighth and three-eighths inches from the side surface. The side surface and the two clip surfaces act in combination to grip a section of the existing automobile visor and hold the shield member in a desired position.

One of the clip members is positioned with respect to a shorter side edge of the shield member a distance within at least twenty percent of the length of one of the longer side edges. The other clip member is positioned with respect to the same side edge a distance therefrom of between twenty-two and thirty-seven percent of the length of one of the longer side edges. The use of two clip members positioned close to one of the shorter side edges allows the shield member to be extended rearward into the back passenger compartment of the automobile when the existing visor is pivoted against the side window of the automobile door. The distance rearward depends upon the positioning of the clip members and the length of the shield member. Positioning the first clip member within a distance of the third shorter side edge of at least twenty percent of the length of one of the longer side edges; and the second clip member within a distance of the third shorter side edge of between twenty-two and thirty-seven percent of the length of one of the longer side edges allows a section of the shield member to extend away from the existing sun visor a distance of up two sixty-three percent of the longer length of the sun shield member in a rearward direction toward and across the rear window of the vehicle.

Locating both clip members on one side of the shield member allows the shield member to be positioned in a variety of effective sun shielding positions. For instance, when the shield member is attached to the existing sun visor adjacent the windshield, the shield member may be positioned toward the rear view mirror block the entrance of uncomfortable light from the area of the windshield between the sun visor and the rear view mirror. The sun shield may also be secured to the existing sun visor and positioned to extend past the end of the sun visor when in this position the shield member may be placed above the head of a front seat passenger to provide shade to the passengers head and shoulder area or positioned adjacent the side window to block incoming sun rays from the side.

The shield member is preferably constructed of a plastic material and, more preferably, constructed from a transparent, tinted plastic material such as plexiglass. Although the clip members may be secured to the shield member through the use of fasteners and adhesives, the clip members are preferably integrally formed with the shield member. The clip members preferably include a contoured tip section, positioned adjacent the planar clip surface, that has a contoured surface area to allow the clip member to be more easily placed over the existing visor. To aid easy placement, at least ninety percent of the contoured surface area should be spaced a distance away from the planar side surface a distance greater than the distance between the planar side surface and the planar clip surface.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
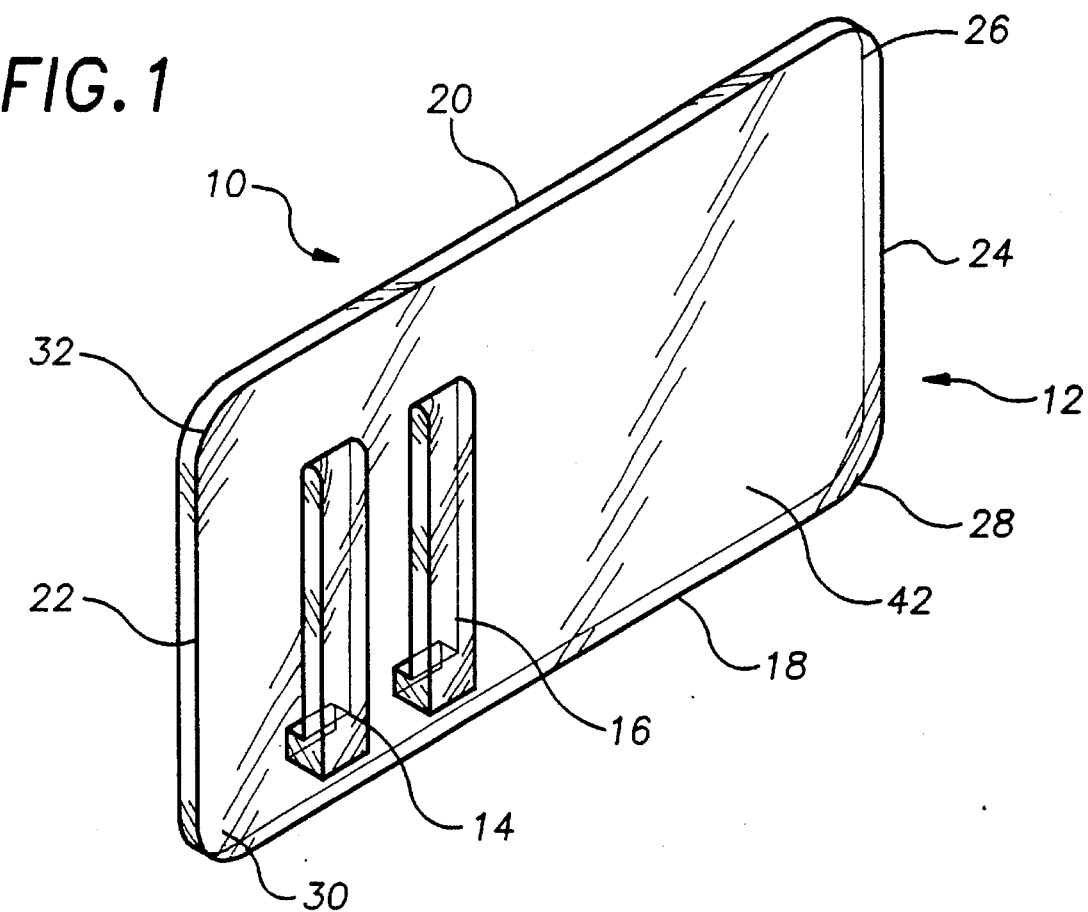
FIG. 1 is a perspective view of an exemplary embodiment of the automobile sun shield of the present invention.

FIG. 1 is a perspective view of an exemplary embodiment of the automobile sun shield of the present invention, generally referenced by the numeral 10. Sun shield 10 includes a shield member, generally referenced by the numeral 12, and first and second clip members 14,16.

Shield member 12 is a substantially rectangular section of one-eighth (⅛") inch thick, green tinted, plexiglass. The longer sides 18,20 are parallel and measure about ten inches. The shorter sides 22,24 are parallel and measure about five inches. The four corners 26,28,30,32 of shield member 12 are curved.

Figure 2:
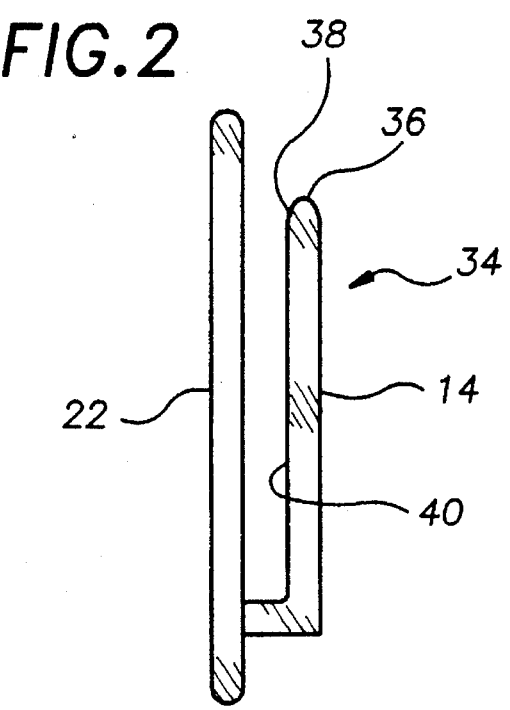
FIG. 2 is a side view of the exemplary embodiment of the sun shield of FIG. 1.

With reference to FIG. 2, an end-side view from shorter side 22, in this embodiment, first and second clip members 14,16 are identical in construction. Clip members 14,16 are constructed from a three (3") inch by one and one-half (1½") inch rectangular section of three-eighths (⅜") inch thick, green tinted plexiglass from which a two and one-half (2½") inch long, one and one-half (1½") inch wide, and one-quarter (¼") inch thick portion has been milled away at one end thereof, generally indicated by the numeral 34. Tip section 36 includes a contoured area 38 that slopes from a planar clip surface 40 to end 34 to form an angled opening for aiding insertion of the automobile visor between the planar clip surface 40 and planar side surface 42 are oriented in parallel with each other.

Figure 3:
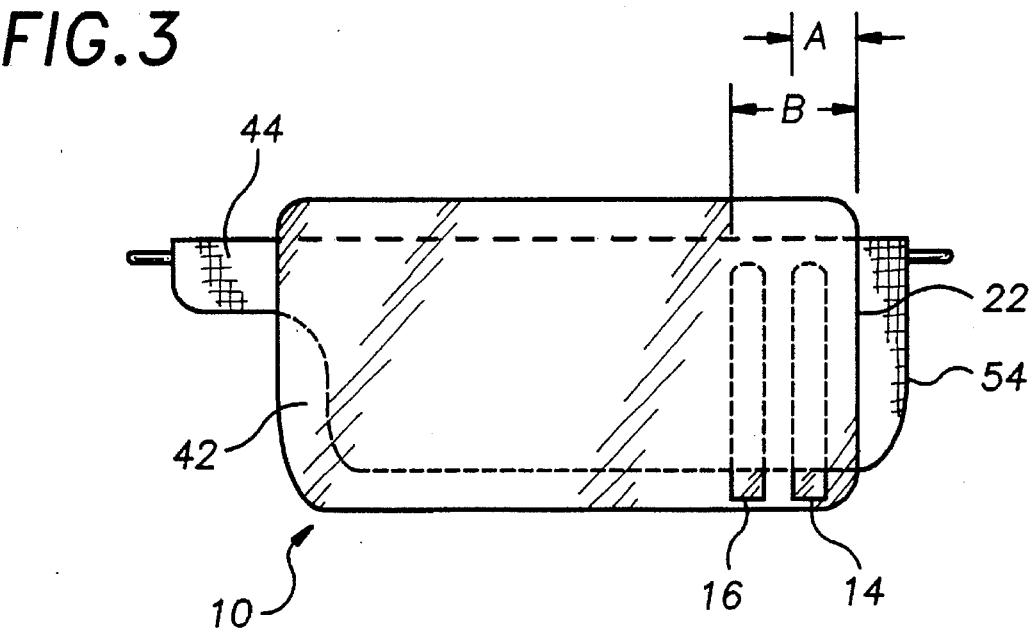
FIG. 3 is a side view of the exemplary embodiment of the sun shield of FIG. 1 in use with a representative passenger seat automobile sun visor in the storage configuration.

FIG. 3 a side view of sun shield 10 in use with a representative passenger seat automobile sun visor 44. In this figure sun shield 10 is in a fully retracted storage configuration. As shown in the figure, clip member 14 is secured to planar side surface 42 a distance "A" of about one and three-fourths (1¾") inches from shorter side 22 and clip member 16 is secured to planar side surface 42 a distance "B" of about three and one-half (3½") inches from shorter side 22. Clip members 14,16 are secured to planar side surface 42 with an epoxy glue.

Figure 4:
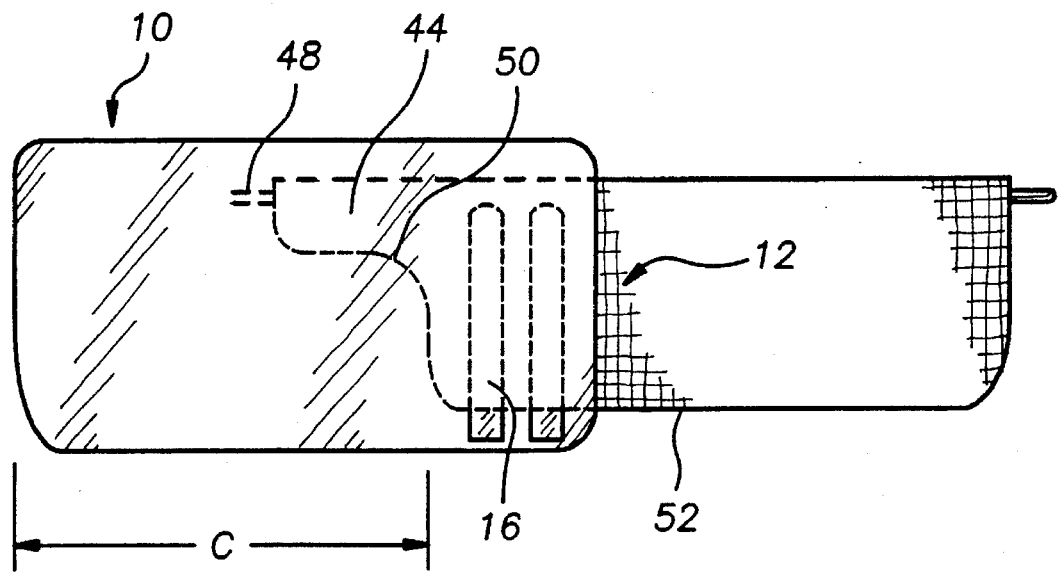
FIG. 4 is a side view of the exemplary embodiment of the sun shield of FIG. 1 in use with a representative passenger seat automobile sun visor extended rearward in the sun shielding configuration.

FIG. 4 is a side view of sun shield 10 in use with representative sun visor 44. In this figure, sun shield 10 is extended rearward of the traveling end 48 of sun visor 44 in the sun shield configuration. In this configuration, shield member 12 extends a distance "C" of about seven (7") inches past the effective shielding edge 50 of sun visor 44.

Use of sun shield 10 is now described with general reference to FIGS. 1–4. Sun shield 10 is secured to sun visor 44 by forcing an edge 52 of sun visor 44 between planar clip surface 40 and planar side surface 42. Friction between planar clip surface 40 and sun visor 44 and planar side surface 42 and sun visor 44 holds sun shield 10 in a user selected position. When not in use, sun shield 10 is stored by positioning clip member 14 near edge 54 (FIG. 3) of sun visor 44. When it is desired to use sun shield 10, clip member 16 is positioned near shielding edge 50 (FIG. 4). It is preferred to move sun shield 10 from the storage position to the use position after sun visor 44 has been pivoted away from the wind shield of the automobile and positioned adjacent the side window.

It can be seen from the preceding description that an automobile sun shield that is attachable to the existing sun visor of an automobile; that is easily stored out of the way when not in use; and that extends from the existing sun visor to provide shielding from sunlight shining into the automobile through the rear window of the automobile has been provided.

It is noted that the embodiment of the automobile sun shield described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An automobile sun shield comprising:

a substantially rectangularly shaped, one piece shield member having a fist and second substantially planar side surface, a length along first and second substantially parallel longer side edges of between eight and fourteen inches, a width along third and fourth substantially parallel shorter side edges of between three and one-half and six inches, and a thickness of between one-sixteenth and one-fourth of an inch, said shield member having four arcuately curved corners formed at convergences of said first and second longer side edges and said third and fourth shorter side edges;

a first clip member, secured to said first planar side surface, including a first planar clip surface having an area of at least two square inches, said first planar clip surface being positioned parallel to said first planar side surface and spaced a distance of between one-eighth and three-eighths inches from said first side surface, said first clip member being positioned within a distance of said third shorter side edge of at least twenty percent of said length of one of said longer side edges; and a second clip member, secured to said first planar side surface, including a second planar clip surface having an area of at least two square inches, said second planar clip surface being positioned parallel to said first planar side surface and a spaced a distance of between one-eighth and three-eighths inches from said first side surface, said second clip member being positioned within a distance of said third shorter side edge of between twenty-two and thirty-seven percent of said length of one of said longer side edges.

2. The automobile sun shield of claim 1, wherein:

said shield member is constructed of a plastic material.

3. The automobile sun shield of claim 1, wherein:

said first clip member includes a first contoured tip section positioned adjacent said first planar clip surface that has a first contoured surface area, at least ninety percent of said contoured surface area being spaced a distance away from said first planar side surface a distance greater than said distance between said first planar side surface and said first planar clip surface; and said second clip member includes a second contoured tip section positioned adjacent said second planar clip surface that has a second contoured surface area, at least ninety percent of said second contoured surface area being spaced a distance away from said first planar side surface a distance greater than said distance between said first planar side surface and said second planar clip surface.

4. The automobile sun shield of claim 3, wherein:

said shield member is constructed of a plastic material.

5. The automobile sun shield of claim 4 wherein:

said plastic material is transparent and tinted.

\* \* \* \* \*